(12) United States Patent
Hammel et al.

(10) Patent No.: US 11,218,102 B2
(45) Date of Patent: Jan. 4, 2022

(54) METHOD FOR DETERMINING A ROTOR POSITION OF A THREE-PHASE MACHINE WITHOUT USING A ROTARY ENCODER AND DEVICE FOR CONTROLLING A THREE-PHASE MOTOR WITHOUT USING A ROTARY ENCODER

(71) Applicant: SEW-EURODRIVE GMBH & CO. KG, Bruchsal (DE)

(72) Inventors: Wolfgang Hammel, Bruchsal (DE); Harald Wolf, Ubstadt-Weiher (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 9 days.

(21) Appl. No.: 16/957,066

(22) PCT Filed: Dec. 11, 2018

(86) PCT No.: PCT/EP2018/025313
§ 371 (c)(1),
(2) Date: Jun. 22, 2020

(87) PCT Pub. No.: WO2019/120617
PCT Pub. Date: Jun. 27, 2019

(65) Prior Publication Data
US 2020/0350843 A1 Nov. 5, 2020

(30) Foreign Application Priority Data
Dec. 22, 2017 (DE) .................. 10 2017 012 027.7

(51) Int. Cl.
*H02P 21/18* (2016.01)
*H02P 21/22* (2016.01)
*H02P 21/00* (2016.01)

(52) U.S. Cl.
CPC .......... *H02P 21/18* (2016.02); *H02P 21/0017* (2013.01); *H02P 21/0025* (2013.01); *H02P 21/22* (2016.02)

(58) Field of Classification Search
CPC ................................. H02P 21/18; H02P 21/22
(Continued)

(56) References Cited

U.S. PATENT DOCUMENTS 5,825,113 A * 10/1998 Lipo ...................... H02K 21/44
310/181
9,948,224 B1 * 4/2018 Huh ......................... H02P 21/26

FOREIGN PATENT DOCUMENTS

| DE | 102008058739 A1 | 5/2010 |
| DE | 102010031323 A1 | 3/2011 |
| EP | 2144362 A1 | 1/2010 |

OTHER PUBLICATIONS

Hammel et al., "Operating Point Dependent Anisotropies and Assessment for Position-Sensorless Control," Institute for Electrical Drive Systems and Power Electronics, The Technical University of Munich, 10 pages.

* cited by examiner

*Primary Examiner* — Eduardo Colon Santana
*Assistant Examiner* — Bentsu Ro
(74) *Attorney, Agent, or Firm* — Carter DeLuca & Farrell LLP

(57) ABSTRACT

In a method for determining the rotor position of a three-phase machine without using a rotary encoder, and a device for controlling a three-phase motor without using a rotary encoder, the three-phase machine is fed by a converter that can be operated by pulse-width modulation, and the converter has model variables for the rotor angle and the current indicator of the three-phase machine, and the converter has device(s) by using which, in control operation, at least two (Continued)

values are measured which represent a measure of the local inductances of the machine which represent a measure of the local inductances of the machine, the error of the model rotor angle is determined in that, depending on the model rotor angle and the model current indicator, at least two weighting factors are determined, and in that a weighted sum is formed from the at least two measured values and the at least two weighting factors, and in that a further offset value is subtracted from the sum, which is likewise determined on the basis of the model rotor angle and the model current indicator.

17 Claims, 2 Drawing Sheets

(58) Field of Classification Search
USPC .......................................................... 318/560
See application file for complete search history.

METHOD FOR DETERMINING A ROTOR POSITION OF A THREE-PHASE MACHINE WITHOUT USING A ROTARY ENCODER AND DEVICE FOR CONTROLLING A THREE-PHASE MOTOR WITHOUT USING A ROTARY ENCODER

FIELD OF THE INVENTION

The present invention relates to a method for identifying the rotor position of an electrical three-phase machine having a rotor and a stator, the three-phase machine being driven by pulsed clamping voltages in accordance with the pulse width modulation method.

The present invention also relates to a device for controlling a three-phase machine in open and/or closed loop, a controller being adapted and designed for implementing the described method.

Additionally, the present invention relates to a three-phase machine having a stator, a rotor, and a device for the open and/or closed-loop control thereof. In general, the present invention relates to encoderless control of a three-phase machine in open and/or closed-loop, the rotor position or the rotor angle being derived from the rotor position dependency of the differential, respectively local inductances.

Evaluating the identified local inductances in accordance with example embodiments of the present invention with regard to the rotor position optimally eliminates the stability problem of certain conventional methods. The subject matter hereof is not determining local inductances. For this, reference is made to conventional methods that are suited for continuously determining local inductances during operation of the three-phase machine using suitable injection voltages. Due to the increased use of three-phase motors instead of direct-current motors, there is considerable interest in high-quality closed-loop control systems for three-phase motors. With the aid of rotor position encoders, such as rotary pulse encoders or resolvers, dynamic and efficient closed-loop control systems of three-phase machines can be obtained in conjunction with pulse-controlled inverters. Disadvantageous in this context is that using rotary position encoders entails a rise in costs and in cabling outlay, and makes failure more likely.

BACKGROUND INFORMATION

The rotor position is determined during operation by what are generally referred to as encoderless, rotary encoderless or sensorless methods. The rotor position is determined continuously on the basis of the applied voltages and measured motor currents. A component of the fundamental wave methods is the integration of the voltages induced by the rotation of the rotor. However, it is disadvantageous that these methods fail due to vanishing voltages at low rotational speeds. Injection methods utilize the rotor position-dependent inductances of the machine by evaluating the rotor position-dependent current response to a high-frequency voltage excitation, for example. Generally, the high-frequency voltage excitation is additively superimposed on the fundamental voltage indicator.

The disadvantage associated with conventional injection methods is that they do not use the full information content of the rotor position-dependent local inductance matrix, as only the anisotropic component or even only the direction of the anisotropic component of the entire local inductance matrix is used, for example. Moreover, conventional methods make simplified assumptions about the anisotropy. This easily leads to unstable behavior, as soon as the machine exhibits more complicated anisotropic properties that deviate from the assumption.

The publication, *Operating Point Dependent Anisotropies and Assessment for Position-Sensorless Control*, European Conference on Power Electronics and Applications, Karlsruhe, Sep. 5-9, 2016 by W. Hammel et. al. indicates that the parameters of the local inductance matrix not only depend on the rotor position and the instantaneous torque, but, in particular are also directly influenced by the direction of the fundamental current indicator. For conventional injection-based, rotary encoderless, closed-loop control methods, which are based on simplified assumptions, the result is the condition they formulate for a stable operation with respect to the properties of the anisotropy used for the motors to be operated. If conventional methods are used for motors that do not fulfill this condition, this leads to an unstable operation.

Conventional injection methods can be differentiated by the type of injection. For example, in certain injection methods, an alternating one-dimensional injection voltage is additively superimposed on the fundamental voltage indicator. A simple evaluation based thereon assumes that, in the case of a permanently excited synchronous machine, the orientation of the anisotropy coincides with the direction of the d-axis of the rotor. The alternating injection voltage is selected in parallel to the assumed model d-axis. A correct orientation results in the injection-induced a.c. components in parallel to the injection voltage, and thus the injection is torque-free even at high injection amplitudes. On the other hand, if the assumed model d-axis deviates from the actual d-axis, injection-induced a.c. components result that have an additional component orthogonally to the direction of the injection voltage. As a function of this orthogonal current component, the model angle can be adjusted using the correct preceding sign. Thus, an especially simple manner for adjusting the model angle can be attained as long as an anisotropy having the assumed properties is present. In the case of real machines, however, the anisotropy also depends on the magnitude and direction of the fundamental current indicator and leads to the stability problems mentioned.

Among conventional injection methods, there are those which, per evaluation interval, superimpose injection voltages in different directions on the fundamental voltage indicator.

German Patent Document No. 10 2015 217 986, for example, describes an injection method where the trajectory of the injection voltage indicator tip forms a square. On the basis thereof, a calculation rule, which entails very little computational outlay, is presented to determine the anisotropy as a two-component variable. However, even the method it presents does not resolve the difficulty of possible instability caused by the dependency of the anisotropy on fundamental current, as described by W. Hammel et al. in the publication *Operating Point Dependent Anisotropies and Assessment for Position-Sensorless Control*, European Conference on Power Electronics and Applications, Karlsruhe, Sep. 5-9, 2016. However, in contrast to an injection voltage having an alternating voltage indicator, it is possible to determine the complete differential inductance matrix using this injection scheme.

SUMMARY

Example embodiments of the present invention provide an improved method for identifying the rotor position of an electrical three-phase machine that permits a rotor-position identification that is stable and noise-immune in all operating points, for three-phase machines having any type of properties of the entire local inductance matrix.

Example embodiments of the present invention also relate to a corresponding device for controlling a three-phase machine in closed or open loop.

Example embodiments of the present invention are based on the realization that rotor positions may only be optimally identified when all rotor position-dependent parameters of the entire local inductance matrix are used in accordance with the manner described herein. To achieve a stable operation, the dependency of the parameters of the local inductance matrix on the orientation of the fundamental current indicator in the closed-loop control system is utilized along the lines described herein.

Example embodiments of the present invention presuppose that the complete differential inductance matrix is continuously determined by a preceding method. For example, the injection method described in the German Patent Document No. 10 2015 217 986, which is expressly incorporated herein in its entirety by reference thereto, may be used.

In a method for rotary encoderless determination of the rotor position of a three-phase machine, the three-phase machine is fed by a converter is operable with pulse width modulation, a model rotor angle and a model current indicator of the three-phase machine is determined, in closed-loop controlled operation, in particular, a first measured value of a measure of a first local inductance of the machine is determined, in closed-loop controlled operation, in particular, a second measured value of a measure of a second local inductance of the machine is determined, a function, in particular a function table that is especially determined offline, of differentials of the measures assigns values of the model rotor angle and of the model current indicator to function values, an error, in particular angle deviation, of the model rotor angle is determined by at least two weighting factors being determined by at least two weighting factors being determined as function values of the function, in particular function table, as a function of the model rotor angle and of the model current indicator, and a sum of the measured values weighted by the weighting factors is produced, and, to determine the error, another offset value is subtracted from the sum, which is likewise determined as a function of the model rotor angle and the model current indicator, the further offset value is determined by the further offset value being determined as a function value of the function, in particular function table as a function of the model rotor angle and of the model current indicator by the function, in particular the function table, the model rotor angle is adjusted by a control loop controlling the error toward zero.

According to example embodiments, the local admittances may be used as a measure of the local inductances.

According to example embodiments, the function may be determined, in particular set offline, in particular one time in a step preceding the positional determination, thus, in particular prior to the closed-loop controlled operation, so that the weighting factors and the offset value are assigned by the function to the values of the two model variables online, in particular when the position is determined.

According to example embodiments, to determine the function, the local inductances are determined as a function of values of the rotor position and of the current indicator, in particular, these values of the current indicator representing a trajectory.

According to example embodiments, the weighting factors and the offset value are assigned to the model variables as a function of the differential of the local inductances or local admittances that is specific to the rotor position.

According to example embodiments, each of the at least two weighting factors is produced as a quotient of the differential of one of the measures and of the square sum of all of the differentials of the measures.

According to example embodiments, the assignment for the offset value to be subtracted is set to conform there to this weighted sum when the actual rotor angle of the machine conforms to the model angle.

According to example embodiments, the weighting factors are selected such that that measure which has the greatest manufacturing tolerances is provided with a lower weight or is not considered in the weighted sum.

In the case of the device that includes a converter and a three-phase motor, in particular a rotary encoderless three-phase motor, the three-phase motor is fed by a converter, in particular a pulse-controlled inverter, which is suitably designed for implementing a method described herein.

Example embodiments of the present invention are explained in greater detail below with reference to the appended Figures.

DETAILED DESCRIPTION

Figure 1:
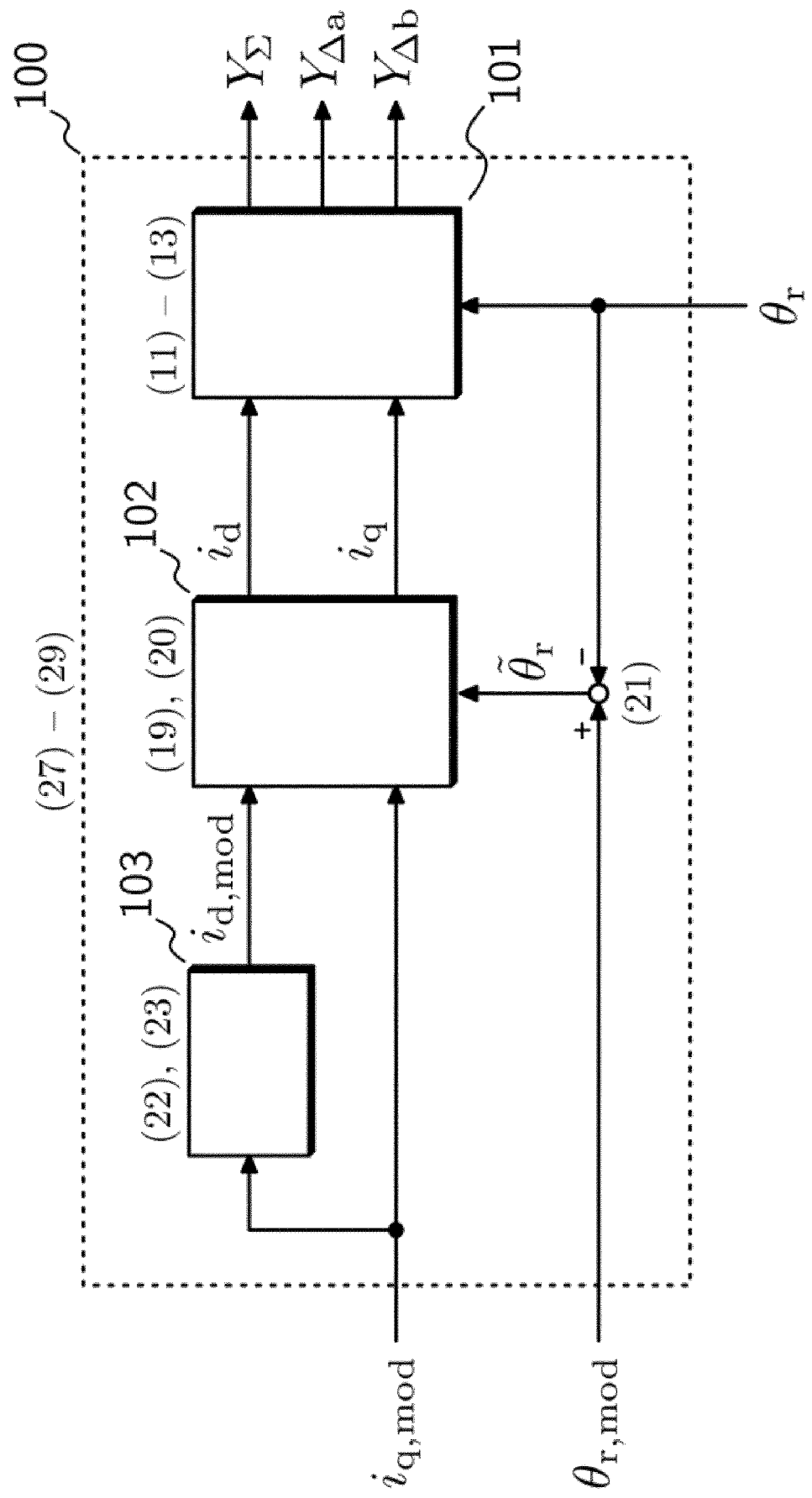
FIG. 1 illustrates the correlation in terms of signal engineering between the model variables known to the converter, the actual rotor position unknown to the converter, and the measurable admittance parameters derived as a function of these variables.

The differential inductance matrix describes the relationship between current variations and the corresponding injection voltage $u_c$. This matrix is symmetrical and, therefore, includes three independent parameters.

$$u_c = \begin{pmatrix} L_a & L_{ab} \\ L_{ab} & L_b \end{pmatrix} \cdot \frac{d}{dt} i_c \qquad (1)$$

Conversely, the current rise in response to an applied injection voltage $u_c$ is determined by the inverse matrix.

$$\frac{d}{dt} i_c = \begin{pmatrix} L_a & L_{ab} \\ L_{ab} & L_b \end{pmatrix}^{-1} \cdot u_c \qquad (2)$$

Inverse Y of inductance matrix L is often referred to as the admittance matrix here as well in the following. This is likewise symmetrical and determined by the three parameters $Y_a$, $Y_b$ and $Y_{ab}$.

$$Y = L^{-1} = \begin{pmatrix} L_a & L_{ab} \\ L_{ab} & L_b \end{pmatrix}^{-1} = \begin{pmatrix} Y_a & Y_{ab} \\ Y_{ab} & Y_b \end{pmatrix} \qquad (3)$$

Thus, the relationship between the applied injection voltage $u_c$ and the corresponding current rise is expressed as follows:

$$\frac{d}{dt}i_c = \begin{pmatrix} Y_a & Y_{ab} \\ Y_{ab} & Y_b \end{pmatrix} \cdot u_c = Y \cdot u_c \quad (4)$$

Using the substitutions (5a)-(5c), the admittance matrix may be reduced as illustrated in (6).

$$Y_\Sigma = \frac{Y_a + Y_b}{2} \quad (5a)$$

$$Y_{\Delta a} = \frac{Y_a - Y_b}{2} \quad (5b)$$

$$Y_{\Delta b} = Y_{ab} \quad (5c)$$

$$Y = \begin{pmatrix} Y_a & Y_{ab} \\ Y_{ab} & Y_b \end{pmatrix} = Y_\Sigma \cdot \begin{pmatrix} 1 & 0 \\ 0 & 1 \end{pmatrix} + Y_{\Delta a} \cdot \begin{pmatrix} 1 & 0 \\ 0 & -1 \end{pmatrix} + Y_{\Delta b} \cdot \begin{pmatrix} 0 & 1 \\ 1 & 0 \end{pmatrix} \quad (6)$$

In this reduction, $Y_\Sigma$ represents the isotropic component of the admittance matrix. On the other hand, the anisotropic component is a variable having magnitude and direction that is represented in (6) by Cartesian components $Y_{\Delta a}$ and $Y_{\Delta b}$ thereof.

The exemplary embodiment may apply to a permanently excited synchronous machine. For such a machine, the local inductance matrix, respectively the local admittance matrix may be determined in the reduction thereof in accordance with (6) with the aid of a square injection, for example. In German Patent Document No. 10 2015 217 986, isotropic component $Y_\Sigma$ may be ascertained from the first component of equation (31) as follows:

$$Y_\Sigma = \frac{\Delta i_{\Sigma x}}{u_c \cdot \Delta t} = \frac{1}{4 \cdot u_c \cdot \Delta t} \cdot (\Delta i_{u\alpha 0} + \Delta i_{u\beta 1} - \Delta i_{u\alpha 2} - \Delta i_{u\beta 3}) \quad (7)$$

This may be simplified to (8), whereby isotropic component $Y_\Sigma$ may be determined directly from the measured current rises.

$$Y_\Sigma = \frac{1}{4 \cdot u_c \cdot \Delta t} \cdot (\Delta i_{\alpha 0} + \Delta i_{\beta 1} - \Delta i_{\alpha 2} - \Delta i_{\beta 3}) \quad (8)$$

Apart from measurement errors, second component $\Delta i_{\Sigma y}$ of equation (31) in German Patent Document No. 10 2015 217 986 is zero.

The anisotropic components $Y_{\Delta a}$ and $Y_{\Delta b}$ are derived from the components of indicator equation (43) in German Patent Document No. 10 2015 217 986 as follows:

$$Y_{\Delta a} = \frac{1}{4 \cdot u_c \cdot \Delta t} \cdot (\Delta i_{\alpha 0} - \Delta i_{\beta 1} - \Delta i_{\alpha 2} + \Delta i_{\beta 3}) \quad (9)$$

$$Y_{\Delta b} = \frac{1}{4 \cdot u_c \cdot \Delta t} \cdot (\Delta i_{\beta 0} + \Delta i_{\alpha 1} - \Delta i_{\beta 2} - \Delta i_{\alpha 3}) \quad (10)$$

Admittance components $Y_\Sigma$, $Y_{\Delta a}$ and $Y_{\Delta b}$ may also be determined using other characteristics of the injection voltage, such as of a rotating injection, for example, as described, for example, in the publication *A Comparative Analysis of Pulsating vs. Rotating Indicator Carrier Signal Injection-Based Sensorless Control*, Applied Power Electronics Conference and Exposition, Austin, Feb. 24-28, 2008, pp. 879-885 by D. Raca et. al.

The method according to an example embodiment of the present invention for rotor position identification is based on determining the three parameters of the admittance matrix. The implementation of the method is not bound to the selected form, respectively reduction in (6). Rather, any other form of representation of the information contained in the admittance matrix may be used as the basis for this.

In particular, to implement the method, it is possible to acquire any three linear combinations from admittance components $Y_a$, $Y_b$, and $Y_{ab}$, respectively, $Y_\Sigma$, $Y_{\Delta a}$, and $Y_{\Delta b}$ to the extent that they are mutually linearly independent.

A component hereof is appropriately utilizing the realization that the three parameters $Y_\Sigma$, $Y_{\Delta a}$ and $Y_{\Delta b}$ of the local admittance matrix depend not only on rotor position $\theta_r$, but, as a function of the operating points, also on components $i_d$ and $i_q$ of the instantaneous fundamental current indicator, thus they are influenced by the magnitude and direction thereof.

$$Y_\Sigma = Y_\Sigma(\theta_r, i_d, i_q) \quad (11)$$

$$Y_{\Delta a} = Y_{\Delta a}(\theta_r, i_d, i_q) \quad (12)$$

$$Y_{\Delta b} = Y_{\Delta b}(\theta_r, i_d, i_q) \quad (13)$$

$\theta_r$ representing the electric angle of the rotor position and $i_d$ respectively $i_q$ the components of the fundamental current indicator.

The following considerations are limited to the base speed range. Here, the machine is typically operated using a torque-generating current on the q-axis, i.e., $i_d = 0$ or along an MTPA (maximum torque per ampere) trajectory, which indicates a fixed association of the d-current as a function of the q-current. This is described by D. Schröder, for example, in *Elektrische Antriebe—Regelung von Antriebssysteme* 3rd edition, Berlin, Springer 2009. Thus the machine is operated in accordance with (14) or (15).

$$i_d = 0 \quad (14)$$

respectively $$i_d = i_{d,MTPA}(i_q) \quad (15)$$

In selecting the operating points, the converter is hereby limited to two remaining degrees of freedom, namely to electric rotor angle $\theta_r$ and q-current $i_q$, while associated d-current $i_d$ results from the q-current from a fixed association in accordance with (14) or (15), for example. For operating points in accordance with this selection, the dependency of admittance parameters $Y_\Sigma$, $Y_{\Delta a}$ and $Y_{\Delta b}$ is also reduced to just two independent variables $\theta_r$ and $i_q$:

$$Y_\Sigma = Y_\Sigma(\theta_r, i_d(i_q), i_q) = Y_\Sigma(\theta_r, i_q) \quad (16)$$

$$Y_{\Delta a} = Y_{\Delta a}(\theta_r, i_d(i_q), i_q) = Y_{\Delta a}(\theta_r, i_q) \quad (17)$$

$$Y_{\Delta b} = Y_{\Delta b}(\theta_r, i_d(i_q), i_q) = Y_{\Delta b}(\theta_r, i_q) \quad (18)$$

In the case of rotary encoderless operation of the motor on a converter, deviations also inevitably arise between actual electric rotor angle $\theta_r$ and corresponding model rotor angle $\theta_{r,mod}$ in the converter. However, even when these ideally turn out to be very small, unstable operation may result in conventional rotary encoderless methods, as described by W. Hammel et. al. in *Operating Point Dependent Anisotropies and Assessment for Position-Sensorless Control*, European Conference on Power Electronics and Applications, Karlsruhe, Sep. 5-9, 2016.

To orient the fundamental current indicator to be applied, the converter will only be able to revert to model rotor angle $\theta_{r,mod}$. If this does not conform to actual electric rotor angle $\theta_r$, the result is that the actual d- and q-current components no longer conform with the corresponding model variables. The d- and q-current components $i_d$ and $i_q$ actually flowing in the motor are dependent at this stage on the model variables in converter $i_{d,mod}$ and $i_{q,mod}$ as well as on the error of rotor angle model $\tilde{\theta}_r$, as follows:

$$i_d = i_{d,mod} \cdot \cos(\tilde{\theta}_r) - i_{q,mod} \cdot \sin(\tilde{\theta}_r) \quad (19)$$

$$i_q = i_{d,mod} \cdot \cos(\tilde{\theta}_r) + i_{q,mod} \cdot \sin(\tilde{\theta}_r) \quad (20)$$

$$\tilde{\theta}_r = \theta_{r,mod} - \theta_r \quad (21)$$

If there is an error of model rotor angle $\tilde{\theta}_r$, the assignment according to (14), respectively (15) between the actual q- and d-current components does not take place, rather model d-current $i_{d,mod}$ is generated as a function of the model q-current $i_{q,mod}$:

$$i_{d,mod} = 0 \quad (22)$$

respectively $$i_{d,mod} = i_{d,MTPA}(i_{q,mod}) \quad (23)$$

Since, in accordance with (11)-(13), the admittance parameters are dependent on actual d- and q-currents $i_d$ and $i_q$, in comparison to (16)-(18), they will have an additional dependency on the error of model rotor angle $\tilde{\theta}_r$ respectively on model rotor angle $\theta_{r,mod}$:

$$Y_\Sigma = Y_\Sigma(\theta_r, i_{q,mod}, \tilde{\theta}_r) \quad (24)$$

$$Y_{\Delta a} = Y_{\Delta a}(\theta_r, i_{q,mod}, \tilde{\theta}_r) \quad (25)$$

$$Y_{\Delta b} = Y_{\Delta b}(\theta_r, i_{q,mod}, \tilde{\theta}_r) \quad (26)$$

respectively $$Y_\Sigma = Y_\Sigma(\theta_r, i_{q,mod}, \theta_{r,mod}) \quad (27)$$

$$Y_{\Delta a} = Y_{\Delta a}(\theta_r, i_{q,mod}, \theta_{r,mod}) \quad (28)$$

$$Y_{\Delta b} = Y_{\Delta b}(\theta_r, i_{q,mod}, \theta_{r,mod}) \quad (29)$$

Thus, measurable admittance parameters $Y_\Sigma$, $Y_{\Delta a}$ and $Y_{\Delta b}$ are dependent on the two model variables $i_{q,mod}$ and $\theta_{r,mod}$ known in the converter as well as on a further variable, namely actual rotor angle $\theta_r$ unknown in the converter.

FIG. 1 shows the internal interaction of the relevant equations, which collectively lead to dependencies (27)-(29). The numbers of the equations, which represent the respective relationships, are indicated in parentheses here.

Model d-current $i_{d,mod}$ is generated from model q-current $i_{q,mod}$ in accordance with selected MTPA characteristic 103 as expressed by equations (22) respectively (23). Actual motor current components $i_d$ and $i_q$ are derived from model current components $i_{d,mod}$ and $i_{q,mod}$ by the transformation of model rotor coordinates into actual rotor coordinates 102 in accordance with equations (19) and (20) using phase angle error $\tilde{\theta}_r$. In accordance with (21), the error of model rotor angle $\tilde{\theta}_r$ is the difference between model rotor angle $\theta_{r,mod}$ and actual rotor angle $\theta_r$. Finally, within the three-phase machine, measurable admittance parameters $Y_\Sigma$, $Y_{\Delta a}$ and $Y_{\Delta b}$ are generated as a function of actual current components $i_d$ and $i_q$ as well as of actual rotor position $\theta_r$ in accordance with equations (11)-(13).

Overall, this results in a mapping 100 of the model variable of q-current $i_{q,mod}$ and of model rotor angle $\theta_{r,mod}$ as well as of actual rotor angle $\theta_r$ onto measurable admittance parameters $Y_\Sigma$, $Y_{\Delta a}$ and $Y_{\Delta b}$, in accordance with equations (27)-(29).

What is decisive is the realization that an error of the model rotor angle does, in fact, influence the admittance parameters, but they may nevertheless be measured, unaltered, using an injection process.

Based on this realization, it is fundamentally possible to use the measured admittance parameters to identify the rotor position. This would be very simple to realize if one of the relationships (27)-(29) could be uniquely solved for rotor angle $\theta_r$ in a reversible process. Generally, however, this is not the case for any of the three variables.

In any case, however, it is necessary to know the dependencies of the admittance parameters on the operating point in accordance with (11)-(13). These may be ascertained, for example, by a preceding offline measurement, it being possible for measurement devices to also be used to determine the rotor position. However, there is no need for this to be determined over the entire d-q current plane to realize the method hereof. If the machine is operated on a current trajectory in accordance with (22), respectively (23), and it is also assumed that the phase angle errors occurring during operation remain small, it suffices to determine the admittance parameters on the current trajectory and in the vicinity thereof.

In accordance with example embodiments of the present invention, the stability problem described by W. Hammel et al. in *Operating Point Dependent Anisotropies and Assessment for Position-Sensorless Control*, European Conference on Power Electronics and Applications, Karlsruhe, Sep. 5-9, 2016 is overcome by a converter internal error signal $\delta_F$ initially being generated from variables $\theta_{r,mod}$ and $i_{q,mod}$, and which are available to the converter, as well as from measured admittance parameters $Y_\Sigma$, $Y_{\Delta a}$ and $Y_{\Delta b}$, whereby this error signal itself again depends only on model q-current $i_{q,mod}$ and model rotor angle $\theta_{r,mod}$ as well as on unknown rotor angle $\theta_r$:

$$\delta_F = \delta_F(\theta_r, i_{q,mod}, \theta_{r,mod}) \quad (30)$$

In accordance with example embodiments of the present invention, this signal is generated to represent a measure of the deviation of model rotor angle $\theta_{r,mod}$ from actual rotor angle $\theta_r$, and this signal is fed to a controller which adjusts model angle $\theta_{r,mod}$ to the actual rotor angle. This may be accomplished by a simple PLL control loop, for example. Alternatively, error signal $\delta_F$ may be used as a correction intervention in a fundamental wave model, which may thereby also be used in the low speed range and at standstill.

Figure 2:
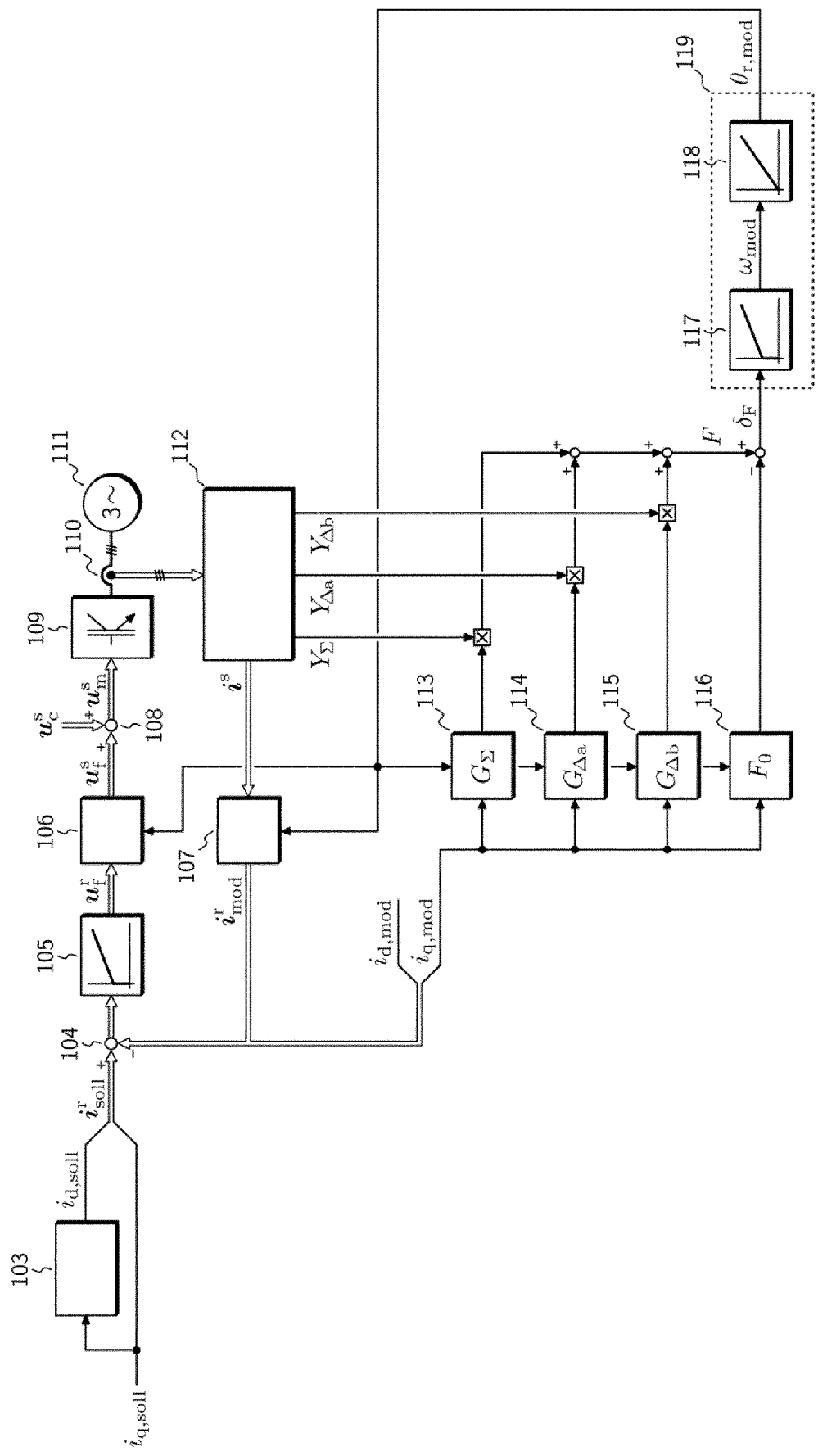
FIG. 2 is a signal flow diagram of an exemplary embodiment of the method.

In accordance with example embodiments of the present invention, error signal $\delta_F$ is generated in accordance with FIG. 2 by a composite signal F which is a weighted sum of the three measured admittance parameters:

$$F = G_\Sigma \cdot Y_\Sigma + G_{\Delta a} \cdot Y_{\Delta a} + G_{\Delta b} \cdot Y_{\Delta b} \quad (31)$$

A quantity $F_0$ is subtracted from this composite signal F, resulting in error signal $\delta_F$:

$$\delta_F = F - F_0 \quad (32)$$

Weights $G_\Sigma$, $G_{\Delta a}$ and $G_{\Delta b}$ as well as quantity $F_0$ are typically not constants, but rather operating point-dependent values. Significant thereby is that there is no need to use actual operating point $\theta_r$, $i_d$ and $i_q$ to determine these quantities. Rather, the use of the possibly faulty model operating point $\theta_{r,mod}$ and $i_{q,mod}$ leads nevertheless in the result to a stable operation and, in fact, even in the case of a non-vanishing phase angle error.

Thus, variables $G_\Sigma$, $G_{\Delta a}$, $G_{\Delta b}$ and $F_0$ are general functions of the model variables:

$$G_\Sigma = G_\Sigma(i_{q,mod}, \theta_{r,mod}) \tag{33}$$

$$G_{\Delta a} = G_{\Delta a}(i_{q,mod}, \theta_{r,mod}) \tag{34}$$

$$G_{\Delta b} = G_{\Delta b}(i_{q,mod}, \theta_{r,mod}) \tag{35}$$

$$F_0 = F_0(i_{q,mod}, \theta_{r,mod}) \tag{36}$$

As a function of the form of these functions $G_\Sigma$, $G_{\Delta a}$, $G_{\Delta b}$ and $F_0$, a tabular or functional mapping or a combination of both is practical for the storing or calculation thereof in the converter. The following assumes a tabularly stored dependency of values $G_\Sigma$, $G_{\Delta a}$, $G_{\Delta b}$ and $F_0$ on the model operating point.

Thus it follows for error signal $\delta_F$, which is dependent on model variables $i_{q,mod}$ and $\theta_{r,mod}$ as well as on actual rotor angle $\theta_r$, that:

$$\delta_F = F_\theta(\theta_r, i_{q,mod}, \theta_{r,mod}) \tag{37}$$

It is possible to form functions $G_\Sigma$, $G_{\Delta a}$, $G_{\Delta b}$, and $F_0$, and, in fact, solely in dependence upon the model variables such that error signal $\delta_F$ acquires the following properties $$\left.\frac{\partial}{\partial \theta_r}\delta_P(\theta_r, i_{q,mod}, \theta_{r,mod})\right|_{\theta_{r,mod}=\theta_r} = 1 \tag{38}$$

$$\left.\frac{\partial}{\partial \theta_{r,mod}}\delta_F(\theta_r, i_{q,mod}, \theta_{r,mod})\right|_{\theta_{r,mod}=\theta_r} = -1 \tag{39}$$

$$\delta_F(\theta_r, i_{q,mod}, \theta_{r,mod})|_{\theta_{r,mod}=\theta_r} = 0 \tag{40}$$

and this permits a stable operation because of the properties mentioned.

Thus, in accordance with equation (38), the required property indicates how error signal h is to respond to a change in actual rotor angle $\theta_r$, namely with a slope 1 in response to a change in actual rotor angle $\theta_r$, proceeding from corrected operating point $\theta_{r,mod} = \theta_r$ in the case of set model angle $\theta_{r,mod}$.

Additionally, the required property in accordance with equation (39) indicates how error signal $\delta_F$ is to respond to a change in model angle $\theta_{r,mod}$, proceeding from adjusted operating point $\theta_{r,mod} = \theta_r$ in the case of set actual rotor angle $\theta_r$, namely with a slope −1 in response to a change in model angle $\theta_{r,mod}$.

Consequently, in the vicinity of corrected operating point $\theta_{r,mod} = \theta_r$, error signal $\delta_F$ is proportional to phase angle error $\tilde{\theta}_r = \theta_{r,mod} - \theta_r$ and is thus suited for adjusting the model angle to the actual motor angle with the aid of a closed-loop control circuit.

Moreover, from required properties (38) and (39) of error signal $\delta_F$, it follows that the value of error signal $\delta_F$ is constant, for example, as selected in (40), constantly zero for all corrected operating points $\theta_{r,mod} = \theta_r$ independently of rotor position $\theta_r$ and model q-current $i_q$.

In another step, $G_\Sigma$, $G_{\Delta a}$, $G_{\Delta b}$ and $F_0$ are formulated at this stage as a function of model variables $i_{q,mod}$ and $\theta_{r,mod}$ to provide error signal $\delta_F$ in accordance with (31) and (32) with the required properties according to (38)-(40).

This is accomplished by executing $G\Sigma$, $G_{\Delta a}$, $G_{\Delta b}$ and $F_0$ as follows:

$$G_\Sigma(i_{q,mod}, \theta_{r,mod}) = \frac{D_\Sigma(i_{q,mod}, \theta_{r,mod})}{D_\Sigma^2(i_{q,mod}, \theta_{r,mod}) + D_{\Delta a}^2(i_{q,mod}, \theta_{r,mod}) + D_{\Delta b}^2(i_{q,mod}, \theta_{r,mod})} \tag{41}$$

$$G_{\Delta a}(i_{q,mod}, \theta_{r,mod}) = \frac{D_{\Delta a}(i_{q,mod}, \theta_{r,mod})}{D_\Sigma^2(i_{q,mod}, \theta_{r,mod}) + D_{\Delta a}^2(i_{q,mod}, \theta_{r,mod}) + D_{\Delta b}^3(i_{q,mod}, \theta_{r,mod})} \tag{42}$$

$$G_{\Delta b}(i_{q,mod}, \theta_{r,mod}) = \frac{D_{\Delta b}(i_{q,mod}, \theta_{r,mod})}{D_\Sigma^2(i_{q,mod}, \theta_{r,mod}) + D_{\Delta a}^2(i_{q,mod}, \theta_{r,mod}) + D_{\Delta b}^2(i_{q,mod}, \theta_{r,mod})} \tag{43}$$

$$F_\theta(i_{q,mod}, \theta_{r,mod}) = \frac{\begin{array}{l}D_\Sigma(i_{q,mod}, \theta_{r,mod}) \cdot Y_\Sigma(i_{q,mod}, \theta_{r,mod}) + \\ D_{\Delta a}(i_{q,mod}, \theta_{r,mod}) \cdot Y_{\Delta a}(i_{q,mod}, \theta_{r,mod}) + \\ D_{\Delta b}(i_{q,mod}, \theta_{r,mod}) \cdot Y_{\Delta b}(i_{q,mod}, \theta_{r,mod})\end{array}}{D_\Sigma^2(i_{q,mod}, \theta_{r,mod}) + D_{\Delta a}^2(i_{q,mod}, \theta_{r,mod}) + D_{\Delta b}^3(i_{q,mod}, \theta_{r,mod})} \tag{44}$$

$D_\Sigma$, $D_{\Delta a}$ and $D_{\Delta b}$ thereby represent the differentials of local admittance parameters $Y_\Sigma$, $Y_{\Delta a}$ and $Y_{\Delta b}$ in accordance with rotor position $\theta_r$. If the dependencies of local admittance parameters according to (27)-(29) are determined in the above described manner, then differentials $D_\Sigma$, $D_{\Delta a}$ and $D_{\Delta b}$ thereof in accordance with rotor position $\theta_r$ may also be indicated for the corrected operating point:

$$D_\Sigma(i_{q,mod}, \theta_{r,mod}) = \left.\frac{\partial}{\partial \theta_r}Y_\Sigma(\theta_r, i_{q,mod}, \theta_{r,mod})\right|_{\theta_r=\theta_{r,mod}} \tag{45}$$

$$D_{\Delta a}(i_{q,mod}, \theta_{r,mod}) = \left.\frac{\partial}{\partial \theta_r}Y_{\Delta a}(\theta_r, i_{q,mod}, \theta_{r,mod})\right|_{\theta_r=\theta_{r,mod}} \tag{46}$$

$$D_{\Delta b}(i_{q,mod}, \theta_{r,mod}) = \left.\frac{\partial}{\partial \theta_r}Y_{\Delta b}(\theta_r, i_{q,mod}, \theta_{r,mod})\right|_{\theta_r=\theta_{r,mod}} \tag{47}$$

If the alternative representation according to (24)-(26) is used for the description of the admittance parameters, thus as a function of actual rotor angle $\theta_r$, of model q-current $i_{q,mod}$ and of error angle $\tilde{\theta}_r$, the relevant differentials present themselves as follows:

$$D_\Sigma(i_{q,mod}, \theta_{r,mod}) = \left[\frac{\partial}{\partial \theta_r}Y_\Sigma(\theta_r, i_{q,mod}, \tilde{\theta}_r) - \frac{\partial}{\partial \tilde{\theta}_r}Y_\Sigma(\theta_r, i_{q,mod}, \tilde{\theta}_r)\right]_{\theta_r=\theta_{r,mod}, \tilde{\theta}_r=0} \tag{48}$$

$$D_{\Delta a}(i_{q,mod}, \theta_{r,mod}) = \left[\frac{\partial}{\partial \theta_r}Y_{\Delta a}(\theta_r, i_{q,mod}, \tilde{\theta}_r) - \frac{\partial}{\partial \tilde{\theta}_r}Y_{\Delta a}(\theta_r, i_{q,mod}, \tilde{\theta}_r)\right]_{\theta_r=\theta_{r,mod}, \tilde{\theta}_r=0} \tag{49}$$

$$D_{\Delta b}(i_{q,mod}, \theta_{r,mod}) = \left[\frac{\partial}{\partial \theta_r}Y_{\Delta b}(\theta_r, i_{q,mod}, \tilde{\theta}_r) - \frac{\partial}{\partial \tilde{\theta}_r}Y_{\Delta b}(\theta_r, i_{q,mod}, \tilde{\theta}_r)\right]_{\theta_r=\theta_{r,mod}, \tilde{\theta}_r=0} \tag{50}$$

The setting of values $G_\Sigma$, $G_{\Delta a}$, $G_{\Delta b}$ and $F_0$ selected in accordance with (41)-(44) in conjunction with (45)-(47) or with (48)-(50) not only fulfills conditions (38)-(40) for the error signal, but also yields the best possible signal-to-noise ratio for error signal $\delta_F$, assuming that the measured values of the admittance parameters $Y_\Sigma$, $Y_{\Delta a}$, and $Y_{\Delta b}$ generate noise in an uncorrelated and normally distributed manner and with the same standard deviation.

Example embodiments of the present invention also include settings that deviate herefrom. Thus, for example, there may be a deviation from the above setting in the following variants:
1. A setting of $G_\Sigma$, $G_{\Delta a}$, $G_{\Delta b}$ and $F_0$ that is not optimal for the signal-to-noise ratio, so that properties (38)-(40) are nevertheless fulfilled for error signal $\delta_F$.
2. A setting, so that error signal $\delta_F$ becomes noise-optimal for different noise characteristics of the measured admittance parameters. The measured admittance parameters may, for example, generate noise with different standard deviations, or the individual admittance parameters generate noise not in an uncorrelated, but in a mutually correlated manner, or the admittance parameters generate noise in accordance with a distribution that differs from the normal distribution. Under these conditions as well, the dependency of values $G_\Sigma$, $G_{\Delta a}$, $G_{\Delta b}$ and $F_0$ on the model variables for which error signal $\delta_F$ has an optimal signal-to-noise ratio, is set in each case.
3. A setting so that the derivatives in (38)-(39) are not constantly +/−1, but deviate therefrom or even vary as a function of the operating point. In this case, an operating point-dependent control loop gain and thus an operating point-dependent transient response results for the control loop which adjusts the modeled rotor position.
4. A setting in accordance with which an individual weight, for example, $G_\Sigma$ is selected to be lower in terms of absolute value or even down to zero. This would be beneficial, for example, if the associated admittance parameter has significant manufacturing tolerances, and different specimen from an ensemble of same motors are to be operated using one single set of parameters. The individual specimen of the ensemble thereby differ with respect to the respective admittance parameter on the basis of manufacturing tolerances.
5. A setting of values $G_\Sigma$, $G_{\Delta a}$, $G_{\Delta b}$ and $F_0$ as a function of three model variables instead of the two model variables described here, for example, as a function of the model rotor angle and both model current components. This would be advantageous if the machine were to be operated not only along a fixed current trajectory, but in a larger range of the d-q current plane or in the entire d-q current plane, as is used, for example, in the field weakening range.

In summary, the following steps are to be implemented to execute the method. The following steps are first performed in a preceding offline process:
1. Determination of the operation point dependency of local admittance parameters $Y_\Sigma$, $Y_{\Delta a}$ and $Y_{\Delta b}$ along the set current trajectory and in the vicinity thereof. This may be done offline for a single specimen of a motor type on a test stand having a rotor position measuring device.
2. Determining the differentials of admittance parameters measured offline in accordance with the rotor position.
3. Setting of the table contents for weighting factors $G\Sigma$, $G_{\Delta a}$ and $G_{\Delta b}$ as well as of term $F_0$ for all operating points.

The subsequent rotary encoderless determination of the rotor position includes the following steps in online operation, as shown in FIG. 2:
1. Measuring local admittance parameters $Y_\Sigma$, $Y_{\Delta a}$ and $Y_{\Delta b}$ using a suitable high frequency injection voltage.
2. Determining the current values for weighting factors $G_\Sigma$, $G_{\Delta a}$ and $G_{\Delta b}$ by accessing the previously set tables as a function of instantaneous model variables $i_{q,mod}$ and $\theta_{r,mod}$.
3. Generating a weighted sum of the measured admittance parameters using the current weighting factors.
4. Determining the current value for term $F_0$ to be subtracted as a function of the instantaneous model variables.
5. Generating error signal $\delta_F$ by subtracting term $F_0$ from the weighted sum.
6. Feeding error signal $\delta_F$ to a control circuit or a fundamental wave machine model.
7. Adjusting model rotor angle $\theta_{r,mod}$ by controlling error signal $\delta_F$ toward zero.
8. Cyclically repeating online steps 1-7.

For the described exemplary embodiment, FIG. 2 depicts the signal flow diagram for controlling a rotary encoderless three-phase machine 111 using the method hereof Three-phase machine 111 is fed by power output stage 109 of an inverter. The currents flowing to the three-phase machine are measured by a two-phase or three-phase current acquisition 110.

Corresponding setpoint d-current $i_{d,soll}$ is determined as a function of setpoint q-current $i_{q,soll}$ which is dependent on the desired torque, in accordance with (14) or (15), via MTPA characteristic curve 103, and the setpoint current indicator derived therefrom is fed in model rotor coordinates $i_{soll}^r$ to setpoint-actual comparison 104. The actual current indicator in model rotor coordinates $i_{mod}^r$ is formed by inverse transformation 107 from the actual current indicator in stator coordinates $i^s$ using model rotor angle $\theta_{r,mod}$.

Current controller 105 generates the fundamental wave voltage in model rotor coordinates of $u_f^r$ and thus adjusts actual current indicator $i_{mod}^r$ to setpoint current indicator Transformation device 106 transforms the fundamental wave voltage from model rotor coordinates into stator coordinates, for which purpose, model rotor angle $\theta_{r,mod}$ is used, in turn.

Injection voltage $u_c^s$ is additively superimposed in stator coordinates $u_f^s$ of on fundamental voltage indicator by summation 108, whereby the entire motor voltage is generated in stator coordinates $u_m^s$ which is amplified by power output stage 109 and fed to machine 111. The injection voltage may also be alternatively added already before transformation 106 into model rotor coordinates.

The currents flowing in the machine are measured by current acquisition 110. Determined herefrom in separation unit 112 are both the fundamental wave current in stator coordinates $i^s$ as well as, from the high-frequency current components, admittance parameters $Y_\Sigma$, $Y_{\Delta a}$ and $Y_{\Delta b}$.

Weights $G_\Sigma$, $G_{\Delta a}$ and $G_{\Delta b}$ used for generating weighted sum F are formed via tables, respectively functional mappings 113-115 as a function of model rotor position $\theta^{r,mod}$ and of model q-current $i_{q,mod}$ Weights $G_\Sigma$, $G_{\Delta a}$ and $G_{\Delta b}$ used for generating weighted sum F are formed via tables, respectively functional mappings 113-115 as a function of model rotor position $\theta_{r,mod}$ and of model q-current $i_{q,mod}$.

Finally, offset $F_0$, which is likewise formed as a function of model rotor position $\theta_{r,mod}$ and of model q-current $i_{q,mod}$ in the table, respectively functional mapping 116 is subtracted from generated weighted sum F. Error signal $\delta_F$ is ultimately hereby formed and is fed in the present exemplary embodiment to a PLL controller 119. This is usually composed of the series connection of a PI element 117 and of an I-element 118. The PLL controller adjusts model rotor angle $\theta_{r,mod}$ formed at the output thereof to actual rotor angle $\theta_r$ so that, in the corrected state, it ultimately agrees with the actual rotor angle, and error signal $\delta_F$ then becomes zero. Additionally available at the output of PI element 117 is a model value of electric angular velocity $\omega_{mod}$ which may be used, for example, as the actual value for a superimposed speed control loop.

LIST OF REFERENCE NUMERALS

- 100 generation of the admittance parameters as a function of the model variables and the actual rotor position
- 101 generation of the admittance parameters as a function of the actual motor sizes
- 102 transformation of model rotor coordinates into actual rotor coordinates
- 103 MTPA characteristic (maximum torque per ampere)
- 104 setpoint-actual comparison of the current control circuit
- 105 current controller
- 106 transformation of model rotor coordinates into stator coordinates
- 107 inverse transformation of stator coordinates into model rotor coordinates
- 108 additive application of the injection voltage
- 109 power output stage
- 110 current measurement
- 111 three-phase machine
- 112 means for determining the admittance parameters and the fundamental wave current
- 113 producing the weight factor for the isotropic admittance component
- 114 producing the weight factor for the anisotropic a-admittance component
- 115 producing the weight factor for the anisotropic b-admittance component
- 116 producing the offset to be subtracted
- 117 PI controller of the PLL controller for forming the model speed
- 118 I-controller of the PLL controller for forming the model rotor angle
- 119 PLL controller (phase-locked loop)

LIST OF SYMBOLS $D_{\Delta a}$ differential of the anisotropic admittance a-component in accordance with the rotor position
$D_{\Delta b}$ differential of anisotropic admittance b-component in accordance with the rotor position
$D_{\Sigma}$ differential of the isotropic admittance component in accordance with the rotor position
F weighted sum of the measured admittance components
$F_0$ offset to be subtracted
$G_{\Delta a}$ weighting factor for the a-component of the anisotropic admittance component
$G_{\Delta b}$ weighting factor for the b-component of the anisotropic admittance component
$G_{\Sigma}$ weighting factor for the isotropic admittance component
$i_c$ carrier current indicator
$i_d$, $i_q$ actual fundamental wave current components in rotor coordinates
$i_{d,mod}$, $i_{q,mod}$ actual fundamental wave current components in model rotor coordinates
$i_{mod}^r$ actual fundamental wave current indicator in model rotor coordinates
$i^s$ actual fundamental wave current indicator in stator coordinates
$i_{d,soll}$, $i_{q,soll}$ setpoint current components of the fundamental wave current
$i_{soll}^r$ setpoint current indicator of the fundamental wave current in model rotor coordinates
$\Delta i_{\alpha n}$, $\Delta i_{\beta n}$ components of the current rises in stator coordinates
$\Delta i_{u\alpha n}$, $\Delta i_{u\beta n}$ components of current rises in voltage coordinates
$\Delta i_{\Sigma x,y}$ current rises due to the isotropic admittance component
L inductance matrix in stator coordinates
$L_a$ a-component of the inductance matrix in stator coordinates
$L_b$ b-component of the inductance matrix in stator coordinates
$L_{ab}$ coupling inductance in stator coordinates
$\Delta t$ time interval
$u_c$ amplitude of the injection voltage
$u_c$ injection voltage indicator
$u_c^s$ injection voltage indicator in stator coordinates
$u_f^r$ fundamental wave current indicator in model rotor coordinates
$u_f^s$ fundamental wave current indicator in stator coordinates
$u_m^s$ machine voltage in stator coordinates
Y admittance matrix in stator coordinates
$Y_a$ a-component of the admittance matrix in stator coordinates
$Y_b$ b-component of the admittance matrix in stator coordinates
$Y_{ab}$ coupling admittance in stator coordinates
$Y_{\Delta a}$ a-component of the anisotropic admittance component in stator coordinates
$Y_{\Delta b}$ b-component of the anisotropic admittance component in stator coordinates
$Y_{\Sigma}$ isotropic admittance component
$\delta_F$ error signal
$\theta_r$ rotor position
$\theta_{r,mod}$ model rotor position
$\tilde{\theta}_r$ error of the model rotor position

The invention claimed is:

1. A method for rotary encoderless determination of a rotor position of a three-phase machine, the three-phase machine adapted to be fed by a converter that is operable with pulse width modulation, the converter having model variables for a rotor angle and a current indicator of the three-phase machine, the converter having a device adapted to measure, in closed-loop controlled operation, at least two values that represent a measure of local inductances of the three-phase machine, comprising:
   determining an error of the model rotor angle by determining at least two weighting factors as a function of the model rotor angle and the model current indicator;
   forming a weighted sum from the at least two measured values and the at least two weighting factors; and
   subtracting, from the sum, another offset value that is determined as a function of the model rotor angle and the model current indicator.

2. The method according to claim 1, wherein the local admittances are used as a measure of the local inductances.

3. The method according to claim 2, wherein an assignment of the weighting factors and of the offset value to the model variables is a function of a rotor position-specific differential of the local inductances or local admittances.

4. The method according to claim 1, wherein the function is determined offline and/or set one time in a step preceding a positional determination and/or prior to a closed-loop controlled operation, so that the weighting factors and the offset value are assigned by the function to the values of the two model variables online when the position is determined.

5. The method according to claim 4, wherein each of the at least two weighting factors is produced as a quotient of the differential of one of the measures and of a square sum of all of the differentials of the measures.

6. The method according to claim 1, wherein the weighting factors are selected such that a measure, which has a greatest manufacturing tolerance, is provided with a lower weight or is not considered in the weighted sum.

7. A method for rotary encoderless determination of a rotor position of a three-phase machine, the three-phase machine adapted to be fed by a converter operable with pulse width modulation, the converter having a model rotor angle and a model current indicator of the three-phase machine, the converter having a measurement device adapted to acquire, in controlled operation, at least two measured values that represent a measure of local inductances of the three-phase machine, comprising:
assigning, by a function table, at least two weighting factors as output variables to the model rotor angle and the model current indicator as two output variables;
determining the model rotor angle and the model current indicator from differentials of local admittance parameters determined offline;
determining an error of the model rotor angle by a weighted sum formed from the at least two measured values and the at least two weighting factors;
subtracting, from the sum, another offset value that determined as a function of the model rotor angle and the model current indicator.

8. The method according to claim 7, wherein the function is determined offline and/or set one time in a step preceding a positional determination and/or prior to a closed-loop controlled operation, so that the weighting factors and the offset value are assigned by the function to the values of the two model variables online when the position is determined.

9. The method according to claim 8, wherein each of the at least two weighting factors is produced as a quotient of the differential of one of the measures and of a square sum of all of the differentials of the measures.

10. The method according to claim 7, wherein the weighting factors are selected such that a measure, which has a greatest manufacturing tolerance, is provided with a lower weight or is not considered in the weighted sum.

11. A method for rotary encoderless determination of a rotor position of a three-phase machine, the three-phase machine adapted to fed by a converter that is operable with pulse-width modulation, comprising:
determining a model rotor angle and a model current indicator of the three-phase machine;
determining, in closed-loop controlled operation, a first measured value of a measure of a first local inductance of the three-phase machine;
determining, in closed-loop controlled operation, a second measured value of a measure of a second local inductance of the three-phase machine;
assigning values, based on a function and/or a function table that is determined offline, of differentials of the measures determining values of the model rotor angle and of the model current indicator to function values;
determining an error and/or an angle deviation of the model rotor angle by at least two weighting factors determined as function values of the function and/or the function table, by the function and/or the function table as a function of the model rotor angle and of the model current indicator;
producing a sum of the measured values weighted by the weighting factors;
to determine the error, subtracting from the sum another offset value that is determined as a function of the model rotor angle and the model current indicator;
determining the further offset value by the further offset value being determined as a function value of the function and/or the function table, by the function and/or the function table, as a function of the model rotor angle and of the model current indicator; and
adjusting the model rotor angle by a control loop controlling the error toward zero.

12. The method according to claim 11, wherein, to determine the function, the local inductances are determined as a function of values of the rotor position and of the current indicator, the values of the current indicator representing a trajectory.

13. The method according to claim 11, wherein a assignment for the offset value to be subtracted is set to conform to the weighted sum when an actual rotor angle of the three-phase machine conforms to the model angle.

14. The method according to claim 11, wherein the weighting factors are selected such that a measure, which has a greatest manufacturing tolerance, is provided with a lower weight or is not considered in the weighted sum.

15. A device, comprising:
a converter;
a three-phase motor; and
a converter adapted to feed the three-phase motor;
wherein the converted is adapted to perform:
(a) a method for determination of a rotor position of the three-phase motor, the three-phase motor adapted to be fed by the converter that is operable with pulse width modulation, the converter having model variables for a rotor angle and a current indicator of the three-phase motor, the converter having a device adapted to measure, in closed-loop controlled operation, at least two values that represent a measure of local inductances of the three-phase motor, the method including:
determining an error of the model rotor angle by determining at least two weighting factors as a function of the model rotor angle and the model current indicator;
forming a weighted sum from the at least two measured values and the at least two weighting factors; and
subtracting, from the sum, another offset value that is determined as a function of the model rotor angle and the model current indicator;
(b) a method for determination of a rotor position of the three-phase machine, the three-phase motor adapted to be fed by the converter operable with pulse width modulation, the converter having a model rotor angle and a model current indicator of the three-phase motor, the converter having a measurement device adapted to acquire, in controlled operation, at least two measured values that represent a measure of local inductances of the three-phase motor, the method including:

assigning, by a function table, at least two weighting factors as output variables to the model rotor angle and the model current indicator as two output variables;

determining the model rotor angle and the model current indicator from differentials of local admittance parameters determined offline;

determining an error of the model rotor angle by a weighted sum formed from the at least two measured values and the at least two weighting factors;

subtracting, from the sum, another offset value that determined as a function of the model rotor angle and the model current indicator; and/or (c) a method for determination of a rotor position of the three-phase motor, the three-phase motor adapted to fed by the converter that is operable with pulse-width modulation, the method including:

determining a model rotor angle and a model current indicator of the three-phase motor;

determining, in closed-loop controlled operation, a first measured value of a measure of a first local inductance of the three-phase motor;

determining, in closed-loop controlled operation, a second measured value of a measure of a second local inductance of the three-phase motor;

assigning values, based on a function and/or a function table that is determined offline, of differentials of the measures determining values of the model rotor angle and of the model current indicator to function values;

determining an error and/or an angle deviation of the model rotor angle by at least two weighting factors determined as function values of the function and/or the function table, by the function and/or the function table as a function of the model rotor angle and of the model current indicator;

producing a sum of the measured values weighted by the weighting factors;

to determine the error, subtracting from the sum another offset value that is determined as a function of the model rotor angle and the model current indicator;

determining the further offset value by the further offset value being determined as a function value of the function and/or the function table, by the function and/or the function table, as a function of the model rotor angle and of the model current indicator; and adjusting the model rotor angle by a control loop controlling the error toward zero.

16. The device according to claim 15, wherein the three-phase motor includes a rotary encoderless three-phase motor.

17. The device according to claim 15, wherein the converter includes a pulse-controlled inverter.

* * * * *